US012709061B2

(12) United States Patent
Baumann

(10) Patent No.: US 12,709,061 B2
(45) **Date of Patent: *Aug. 18, 2026**

(54) DEVICE AND METHOD FOR PROCESSING A 3D POLYMER STRUCTURE

(71) Applicant: uppolluX GmbH & Co. KG, Tuttlingen (DE)

(72) Inventor: Daniel Baumann, Tuttlingen (DE)

(73) Assignee: uppolluX GmbH & Co. KG, Tuttlingen (DE)

( * ) Notice: Subject to any disclaimer, the term of this patent is extended or adjusted under 35 U.S.C. 154(b) by 55 days.

This patent is subject to a terminal disclaimer.

(21) Appl. No.: 18/628,690

(22) Filed: Apr. 6, 2024

(65) Prior Publication Data

US 2024/0269929 A1 Aug. 15, 2024

Related U.S. Application Data

(63) Continuation of application No. PCT/EP2022/077933, filed on Oct. 7, 2022.

(30) Foreign Application Priority Data

Oct. 8, 2021 (EP) .................................... 21201727

(51) Int. Cl.
*B29C 64/264* (2017.01)
*B29C 64/124* (2017.01)
(Continued)

(52) U.S. Cl.
CPC .......... *B29C 64/264* (2017.08); *B29C 64/124* (2017.08); *B29C 64/393* (2017.08);
(Continued)

(58) Field of Classification Search
CPC ... B29C 64/264; B29C 64/124; B29C 64/393; B29C 2791/004; B29C 64/10;
(Continued)

(56) References Cited

U.S. PATENT DOCUMENTS 4,938,763 A 7/1990 Dunn et al.
5,411,730 A 5/1995 Kirpotin et al.
(Continued)

FOREIGN PATENT DOCUMENTS

DE 689 27 956 T2 7/1997
DE 199 21 088 C2 8/2003
(Continued)

OTHER PUBLICATIONS

Heinke et al., "MPS and MRI Efficacy of Magnetosomes from Wild-Type and Mutant Bacterial Strains", International Journal of Magnetic Particle Imaging, vol. 3, No. 2, Jun. 22, 2017, pp. 1-6, DOI: 10.18416/ijmpi.2017.1706004.

(Continued)

*Primary Examiner* — Inja Song
(74) *Attorney, Agent, or Firm* — Orbit IP, LLP; Marc G. Martino

(57) ABSTRACT

A device and method for processing a 3D polymer structure with a paramagnetic substance distributed homogeneously in the material of the 3D polymer structure is disclosed. A magnetic field generator generates a static magnetic field in a working zone of the device. Gradient coils for generating magnetic gradient fields in at least all three spatial directions x, y, z, where the paramagnetic substance can be spatially encoded in a defined voxel V of the 3D polymer structure. An RF field generator irradiates RF radiation into the working zone. A control unit controls the RF field generator in such a way that the spatially encoded paramagnetic substance in the voxel V can be excited by a field frequency of the RF radiation which is tuned to the paramagnetic substance, in order to destroy or decompose the 3D polymer structure solely in the defined voxel V.

15 Claims, 3 Drawing Sheets

(51) Int. Cl.
*B29C 64/393* (2017.01)
*B29K 105/16* (2006.01)
*B29K 505/12* (2006.01)

(52) U.S. Cl.
CPC .. *B29C 2791/004* (2013.01); *B29K 2105/162* (2013.01); *B29K 2505/12* (2013.01); *B29K 2995/0008* (2013.01)

(58) Field of Classification Search
CPC .... B29C 2035/0811; B29C 2035/0861; B29K 2105/162; B29K 2505/12; B29K 2995/0008; A61B 18/1815; A61N 2/004; A61N 5/025; G01N 24/10; G01R 33/60; B33Y 10/00; B33Y 30/00
See application file for complete search history.

(56) References Cited

U.S. PATENT DOCUMENTS 5,690,109 A 11/1997 Govind et al.
6,160,084 A 12/2000 Langer et al.
6,183,658 B1 2/2001 Lesniak et al.
6,535,755 B2 3/2003 Ehnholm
6,808,535 B1 10/2004 Jordan
2007/0031474 A1 2/2007 Tayot
2007/0148437 A1 6/2007 Miller-Schulte
2008/0125854 A1 5/2008 Alt et al.
2008/0129295 A1* 6/2008 Carlton ................ G01R 33/341 361/679.01
2011/0052609 A1 3/2011 Waldoefner et al.
2011/0160515 A1 6/2011 Feucht et al.
2011/0223255 A1 9/2011 Thiesen et al.
2013/0102545 A1 4/2013 Gao et al.
2015/0165225 A1 6/2015 Nadobny et al.
2016/0227876 A1 8/2016 Le et al.
2016/0229120 A1* 8/2016 Levine ............... H04N 1/00838
2017/0236639 A1* 8/2017 Pieper ..................... B22F 10/25 219/76.12
2018/0261363 A1* 9/2018 Lee ......................... B22F 10/16
2019/0136176 A1* 5/2019 Kawachi ................ C12M 35/06
2019/0263060 A1* 8/2019 Goodrich .............. B29C 64/209
2020/0223099 A1* 7/2020 Kim ........................ H01F 1/083
2021/0138257 A1* 5/2021 Dolgoff .................. A61B 5/055
2021/0252662 A1* 8/2021 Prystupa ................. B22F 12/57
2021/0283838 A1 9/2021 Lu et al.
2021/0299952 A1* 9/2021 Xia ........................ B29C 64/393
2021/0323070 A1* 10/2021 Nlebedim ............... B22F 10/34
2021/0402479 A1* 12/2021 Backlund ................ B22F 10/85
2022/0044870 A1* 2/2022 Yahata ................ H01F 41/0253
2022/0288695 A1* 9/2022 Ren ......................... B22F 12/50
2023/0271383 A1* 8/2023 Ruzycki ................ B29C 64/129 264/401
2024/0092026 A1 3/2024 Baumann

FOREIGN PATENT DOCUMENTS

DE 699 17 224 T2 9/2004
DE 102 02 459 A1 4/2005
DE 103 50 248 A1 6/2005
DE 10 2004 017 705 A1 11/2005
DE 10 2008 003 615 A1 7/2009
DE 10 2008 008 522 A1 8/2009
DE 10 2009 058 769 A1 6/2011
EP 0 040 512 B1 1/1986
EP 1 241 485 A2 9/2002
EP 4 094 926 A1 11/2022
JP 2666537 B2 10/1997
WO 97/38058 A1 10/1997
WO 2003/026618 A1 4/2003
WO WO-2005119286 A1 * 12/2005 ............. A61N 1/403
WO 2006/116403 A2 11/2006
WO 2009/118091 A1 10/2009
WO 2018/112472 A1 6/2018

OTHER PUBLICATIONS

Mannucci et al., "Magnetosomes Extracted from Magnetospirillum Gryphiswaldensae as Theranostic Agents in Experimental Model of Glioblastoma", Contrast Media & Molecular Imaging, vol. 2018, Article No. 2198703, Jul. 11, 2018, pp. 1-12, DOI: 10.1155/2018/2198703.

Chandrasekharan et al., "Using Magnetic Particle Imaging Systems to Localize and Guide Magnetic Hyperthermia Treatment: Tracers, Hardware, and Future Medical Applications", Theranostics, vol. 10, No. 7, 2020, 2965-2981, doi: 10.7150/thno.40858.

* cited by examiner

DEVICE AND METHOD FOR PROCESSING A 3D POLYMER STRUCTURE

CROSS-REFERENCE TO RELATED APPLICATIONS

This continuation application claims priority to PCT/EP2022/077933 filed on Oct. 7, 2022, which has published as WO 2023/057624 A1, and also the European application number EP 21 201 727.1 filed on Oct. 8, 2021, the entire contents of which are fully incorporated herein with these references.

DESCRIPTION

Field of the Invention

The present invention relates to a device and a method for processing a three-dimensional (=3D) polymer structure.

Background of the Invention

In practice, various mechanical, thermal or chemical processing methods are used to process 3D polymer structures. For example, cutting processes or thermal processes, such as with laser radiation, can be used.

A major problem with the known processing procedures is their limited spatial resolution, the fact that the tool can only be applied from the outside and the sometimes difficult process control.

It is therefore the object of the invention to provide a device and a method with which a 3D polymer structure can be processed in a simple and highly precise manner both in vitro and in vivo, i.e., in the human/animal body, with a previously unattained resolution.

SUMMARY OF THE INVENTION

Solution to the Task According to the Invention

The task relating to the device is solved by a device having the features specified in claim 1 and the problem relating to the method is solved by a method having the features specified in claim 10.

Device:

The device according to the invention serves to process a 3D polymer structure with a paramagnetic (or superparamagnetic) substance arranged in the material of the 3D polymer structure—as homogeneously, i.e., evenly, distributed as possible, comprising: a magnetic field generator for generating a static magnetic field $B_0$ in a working zone of the device in which the 3D polymer structure can be arranged; Gradient coils for generating magnetic gradient fields in at least all three spatial directions x, y, z, by means of which the paramagnetic substance can be spatially encoded in a defined voxel V of the 3D polymer structure; a radio frequency (RF) field generator for irradiation of RF into the working zone (26); and a control unit (22) which is configured to control the RF field generator (20) in such a way that the spatially encoded paramagnetic substance (32) in the voxel V is excited by means of a field frequency of the RF radiation (42) tuned to the paramagnetic substance (32) in order to thermally destroy the 3D polymer structure, preferably solely or essentially solely, in the defined voxel V.

The device according to the invention allows high-precision processing of 3D polymer structures with superior spatial resolution. This is achieved by RF stimulation of the paramagnetic substance in defined electromagnetic resonance niches, which are generated in a location-specific manner, in particular on the basis of high-resolution image data, by targeted superimposition of magnetic gradient fields within the 3D polymer structure. The 3D polymer structure can have any geometry, structure, surface design and, depending on the materials used, also different material properties. Single and multiple post-processing procedures of the 3D polymer structure are possible. This makes it possible to achieve a spatial structure and surface quality of the 3D polymer structure that was previously impossible or difficult to realize.

According to a preferred further development of the invention, the device can also be used to produce the 3D polymer structure from a polymer precursor (=prepolymer or polymer template) with a paramagnetic substance distributed (homogeneously or essentially homogeneously) in the material of the polymer precursor. The polymer precursor can be arranged in the working zone of the device. The gradient coils can be used to generate magnetic gradient fields $B_1$, $B_2$, $B_3$ in at least all three spatial directions x, y, z in order to three-dimensionally locate the paramagnetic substance simultaneously or sequentially in defined voxels V of the polymer precursor. In this embodiment of the device, the control unit is additionally set up or programmed to control the RF field generator in such a way that the spatially encoded paramagnetic substance in the respective voxel V can be excited by means of a field frequency of the RF radiation tuned to the paramagnetic substance in such a way that thermal polymerization of the polymer precursor in the defined voxel V is made possible.

With this embodiment of the device, the 3D polymer structure can therefore be both produced and post-processed.

The (super)paramagnetic substance is preferably arranged homogeneously or essentially homogeneously, i.e., evenly distributed, in the material of the polymer precursor/the 3D polymer structure. The material of the polymer precursor/the 3D polymer structure thus has a consistent or essentially consistent mass fraction of the (super)paramagnetic substance in each spatial volume of the same size. This is advantageous for a reproducible, defined spatial resolution in the production of the 3D polymer structure or during its post-processing.

According to the invention, the device can comprise an appliance for image data acquisition or image acquisition. In other words, an appliance for acquiring image data. Particularly preferably, the device comprises an MRI unit. Such an MRI unit enables the acquisition of image data from the working zone, i.e., the 3D polymer structure or the polymer precursor, and, if required, also from the respective environment (here in particular tissue structures in vivo). MRI units can be functionally expanded to a device according to the invention by suitable programming of their control software. It goes without saying that this also applies in principle to existing MRI units.

According to the invention, the device can additionally or alternatively comprise a computer tomograph (=CT), a digital volume tomograph (=DVT), a sonography unit, a LASER scanner and/or a positron emission tomograph (=PET) or one or more cameras, for example one or more CCD or infrared cameras, in order to acquire suitable image data from the aforementioned regions of the 3D polymer structure or the polymer precursor.

To obtain image data, the device can also have or be set up for so-called magnetic particle imaging (MPI for short). This makes it possible to specifically determine the distribution of the (para)magnetic substance in a volume of the polymer material or the polymer precursor. In contrast to MRI, where the influence of the respective examined material (=polymer material/polymer precursor) itself (magnetic resonance properties of protons) is measured, the location and concentration of the magnetic material or paramagnetic substance can be determined using the magnetization of the magnetic material or paramagnetic substance that can be achieved by the MPI functionality of the device.

The control unit of the device preferably has an operating mode for obtaining and evaluating image data, in particular magnetic resonance tomography data, from the working zone of the device. As a result, image data can be obtained from the 3D polymer structure or the polymer precursor and, if required, also from the respective environment (here in particular tissue structures in vivo) before, during and after the manufacturing or machining process. This allows the device to incorporate imaging diagnostics during the processing or production of the 3D polymer structure thereby combining the logic of electromagnetic and biomimetic induction principles.

If the device includes an MRI or MPI functionality, thermometry data can also be obtained from the working zone, i.e., from the 3D polymer structure or the polymer precursor, and, if necessary, also the corresponding surroundings (here in particular tissue structures in vivo). In addition, MRI-based elasticity measurements (=magnetic resonance elastography) and MPI-based viscosity measurements in the aforementioned regions are also possible. The above-mentioned thermometry data or elasticity/viscosity measurements can be taken into account when processing/generating the 3D polymer structure, for example when determining the duration or intensity of the RF field to be irradiated to excite a defined voxel.

When processing/manufacturing the 3D polymer structure, thermodynamic phenomena are known to represent an important source of artifacts, the effects of which must be limited to the greatest possible extent. This is to prevent both micro-dimensional losses in detail resolution and macro-dimensional structural inhomogeneities and irregularities in the 3D polymer structure.

Thermosensitive sequences in the context of so-called MRI-assisted HIFUS treatments (highly focused ultrasound) have recently proven their clinical practicability and reliability. In particular, the proton resonance method is characterized by a high spatial, temporal and thermometric resolution and reliability and is therefore also suitable for monitoring the machining or manufacturing process in order to detect disadvantageous heat dissipation or accumulation in three-dimensional space at an early stage. According to the invention, the device can be designed to perform such thermosensitive sequences.

The device preferably has a software application by means of which absolute temperature values can be derived and preferably color-coded using the data obtained by the thermosensitive sequences, user-defined topographical and thermal threshold values can be coupled to alarms in a location-specific manner and compliance with precise exposure dose limits can be automated or regulated semi-autonomously.

While a reduction in the detail resolution during processing or production of the 3D polymer structure is due to blurring of the de/polymerization boundaries, which occur as a result of thermodynamic, voxel-exceeding heat conduction during the manufacturing process, macro-dimensional aberrations occur on the basis of coarse heat accumulations primarily only after the end of the RF irradiation. This can lead to shrinkage and distortion of the processed polymer structure or the polymer structure to be produced due to material relaxation during cooling. These phenomena can be further reduced by preheating and postheating the 3D polymer structure or the prepolymer.

In the case of in-vivo processing and production, the physiological body temperature and the relatively low transition thresholds of the prepolymers or the (partially) cured polymer material mean that only very minimal temperature gradients are to be expected compared to the industrial (ex-vivo) processing/production of 3D polymer structures, which for example, could be overcome via accessory heat sources (e.g., infrared diodes, UV/laser diodes, high-energy radiators, hot air) and/or fractional heating, optimized by segmentation methods and thermometry thresholds.

Annealing—i.e., preheating—of the 3D polymer structure/prepolymer—and optionally also of the entire site and/or—in vivo of the anatomical region—serves in this case to mitigate the temperature gradients and homogenize the temperature profile in general, as well as specifically to reduce the energy quantities to be applied inductivel, and thus to reduce the risk of aberrant heat dynamics at micro and macro level. The more clearly and narrowly the transition threshold of the material is defined during the processing and production of the 3D polymer structure, the more precise is the generative accuracy. In addition, the lower the thermal conductivity of the prepolymer/polymer material used, the lower the risk of heterotopic heat accumulation and thus of a dystopic polymerization or destruction of the polymer material of the 3D polymer structure, i.e., the higher the thermal and consequently the structural resolution capacity.

In order to avoid macro-dimensional and micro-dimensional heat accumulation, the generation of large differences in solidity and volume, concentrated material masses, strong offsets, and high temperature differences in the 3D polymer structure should be avoided. On the other hand, the processing and manufacturing resolution in the prepolymer/3D polymer structure increases with the steepness of the temperature gradient between inductively heated, isolated individual voxels relative to their surroundings, which is why cooling measures should even be considered at relevant boundary zones, functional reliefs and edges to optimize details.

A certain stimulation redundancy of the oscillators or inertia of the polymerization/depolymerization (destruction) can also reduce the susceptibility to thermal artifacts in favor of the structural resolution capacity. In the multi-shot concept, a plurality of stimulative RF pulses is correspondingly necessary in order to reach the respective transition temperature of the depolymerization/polymerization, tightly tuned to the thermal conductivity of the polymer/prepolymer, resulting in a steeper temperature gradient to the respective adjacent voxel and thus a higher selectivity.

During the production of the polymer structure, the structural conditions change with increasing curing of the polymer, with considerable influence on heat dissipation. Due to zonally varying material continuity and solidification, an increasingly heterogeneous thermal system results as the curing of the polymer precursor or destruction of the polymer material progresses, in which accumulation effects create a coexistence of overheated and overcooled zones, which must be preemptively anticipated in calculations and proactively compensated for in order to avoid dystrophic polymerization/depolymerization (=destruction) to the greatest possible extent. This is achieved by assessing all described phenomena and taking into account all mentioned influencing factors-on the one hand by selecting a suitable thermos-responsive (pre)polymer(-composite) with a favorable thermal transition threshold and advantageous thermal conductivity (see above), as well as in particular by targeted modulation of the RF pulse duration and intervals, and the temporal and spatial perception thereof in three-dimensional space by dynamic adaptation of the resonance-vulnerable voxel size and voxel position by means of dynamic magnetic field gradients.

A longer continuous local RF excitation of the polymer material of the 3D polymer structure/prepolymer to be processed leads results in a steeper temperature gradient than a repetitive short, pulsed excitation, and the sequential excitation of two immediately adjacent voxels leads in sum to a locally higher heat accumulation than the stimulation of two voxels remote from each other.

It should be noted that the polymerization of the polymer precursor may potentially limit the oscillation capacity—and the resonance specificity of the (nano)oscillators—with a self-terminating effect. In general, the thicker and larger the 3D polymer structure to be produced and the stronger its material, the higher the risk of heat accumulation; the smaller, slimmer and more discontinuous the 3D polymer structure to be produced, the faster a temperature equalization occurs.

For this reason, it is all the more important to take into account the effects that can be calculated therefrom at the earliest possible stage, to incorporate them into the CAD design of the 3D polymer structure to be produced and into the optimization of the sequence algorithm, and, if necessary, to adaptively regulate them in real time.

This also includes the consideration of special shapes and structural interruptions as heat conductors or thermal obstacles in the CAD construction plan in order to channel or contain heat conduction phenomena, to generate local stresses in a targeted manner and to reduce them elsewhere.

Irrespective of this, a higher concentration of the paramagnetic substance or the (nano)oscillator concentration of the polymer material of the 3D polymer structure or the prepolymer theoretically leads to a higher inductive spatial resolution.

An increase in the procedural ambient pressure, accompanied by a reduced prepolymer fluctuation, can also promote the inductive spatial resolution in the production of the 3D polymer structure. Although macro aberrations occur across layers, particularly during cooling, they also occur within the layers during material consolidation. This phenomenon can also be effectively counteracted by increasing the ambient pressure and providing sufficient polymer precursor reserves.

By means of the device according to the invention, the 3D polymer structure can thus be processed in all spatial directions or the polymer precursor can be polymerized in all spatial directions, so that a “real 3D” processing or manufacturing process of the 3D polymer structure can be realized. The traditional layering phenomena are neutralized here.

The control unit is preferably configured, in particular, programmed to control all operating parameters of the device relevant for processing/creating the 3D polymer structure, on the basis of predefined CAD data of the 3D polymer structure.

Particularly preferably, the control unit is configured, in particular programmed, by means of repetitive imaging utilizing, Magnetic resonance tomography, computed tomography, digital volume tomography, sonography, laser scanning and/or positron emission tomography of magnetic particle imaging, to compare the image data of the at least partially manufactured 3D polymer structure/the polymer precursor with the CAD/CAM data of the 3D polymer structure and, if the findings exceed a defined deviation of the image data from the CAD/CAM data, to adjust the operating parameters and/or CAD/CAM data for manufacturing/machining the remaining 3D polymer structure in such a way that (further) deviations from the CAD/CAM data during manufacturing/machining of the rest of the 3D polymer structure are counteracted. In other words, the control unit is configured to align the desired/actual state of the polymerization of the polymer precursor or the machined 3D polymer structure with the CAD/CAM data by means of repetitive image acquisitions and to continue controlling the further manufacturing or machining process of the 3D polymer structure on the basis of the data thus obtained. Ideally, MRI (magnetic resonance tomography) should be used for this purpose, although the aforementioned alternative imaging equipment can also be used-possibly in a multimodal combination.

Based on the technique of resonance niche induction, the device according to the invention thus enables overall processing of 3D polymer structures, which can be referred to as the MRiA or RNI-Δ process, and, if required, an additive manufacturing process of the 3D polymer structure, which can be referred to as magnetic resonance induction polymerization, or “MRiP” or RNI-α for short.

The 3D polymer structure that can be processed or manufactured by means of the device can be any product made from a polymer or polymer composite material. The 3D polymer structure can thus be a machine element. In particular, axles, shafts, bearing elements, gear parts, sealing elements, connecting elements, housing (parts), etc. can be contemplated. The 3D polymer structure can also be a medical product, for example an epithesis, an orthosis, a bandage, a brace, a dental veneer, a respiratory tube, a tissue adhesive, a medical implant or a (bio-)artificial structure for tissue or organ replacement. Furthermore, the 3D polymer structure can be an everyday object, such as jewelry, a watch case, a toy, a carrying container, tableware, cutlery, an electrically insulating layer or an electrically conductive layer, or more generally a coating of any other structure.

On the basis of precisely controlled induction phenomena, modern material sciences and imaging modalities, CAx technology, nanotechnology, stem cell research and developmental biology, the device according to the invention can, by its means of magnetic resonance induction polymerization and processing, transfer the potential of generative 3D processes into the medical context of tissue engineering and—using magnetic resonance as a diagnostic, navigational, monitoring instance and generative force at the same time—directly into the living body.

In-situ (bio)fabrication and processing offers all the advantages of natural tissue regeneration within a physiological, bioresponsive environment right from the start and thus solves the cardinal problems of conventional tissue replacement products and conventional bioreactors, such as lack of stability, lack of integrativity, lack of adaptivity, lack of interactivity and insufficient vitality. It follows from this that precise stimulation of the paramagnetic substance via the design of the internal structure and surface texture of the 3D polymer structure exerts a direct and indirect influence on the quality and intensity of its interaction with the recipient organism. Thus, mastery of electromagnetic induction results in mastery of biomimetic induction and consequently the bioactive competence of the implant and the bioauthentic capacity of the regenerated tissue structures.

The device according to the invention holds the key to universality and the enormous potential to process or even produce a 3D polymer structure that is highly flexible and individualized on both the microtopographic and macro-architectural level to meet the diversity of tissue defects and recipients in need of therapy. By means of the device, a 3D polymer structure can be processed and even produced that authentically emulates the natural anisotropy of hierarchically organized biological tissue and the deterministic complexity of bioartificial interfaces, in order to create the biomimetic features at the earliest possible moment, and durably, that are required for long-term functionality of the implant in the overall systemic environment.

The device can be used, for example, for the in-vivo production and processing of the 3D polymer structure. Here, a seamless interconnection of the 3D polymer structure to be fabricated with the body's own structures or structures foreign to the body can be realized, i.e., their anchoring at the target location with the surrounding tissue. The device thus allows direct in-situ 3D bioprinting, including (re)processing of the 3D polymer structure in the living organism. The optional vitalization of the 3D polymer structure by passive and/or active cell colonization, for example, can be realized in a contactless and minimally invasive manner.

If the device has at least one or more of the above-mentioned appliances for image (data) acquisition (=image acquisition unit), an image-controlled or image-guided application or positioning of the 3D polymer structure/polymer precursor at the predetermined target site is made possible. This is advantageous in particular for the in-vivo fabrication of the 3D polymer structure from the polymer precursor.

It should be noted that the device according to the invention, when used in the medical field, enables 3D processing or 8D production of the 3D polymer structure in the broader sense. That is, it is a technology that can "add" and "subtract" material in all spatial directions without constraint of axes ("real" 3D). For in-vivo production, the 3D polymer structure can interact with its environment (4D), provide instructions (5D), be vitalized by cells (6D) and thus be transformable up to complete biological integration (7D), but can also be modified without contact and, optionally multiple times from the outside (8D). It should be emphasized in particular here that "real" 3D processing guarantees a homogeneous isotropic—i.e., uniform—load-bearing capacity of the 3D polymer structure, whereas classic 3D printed products generally have a direction-dependent mechanical load-bearing capacity depending on the traditional build-up axis (z-axis).

In the medical context, the device according to the invention and/or the 3D method according to the invention (MRiP/MRiA) serves the purpose of repairing, reconstructing, respecting, correcting and optimizing the integrity and interactivity of functional anatomical structures in order to stimulate and amplify authentic regenerative processes. This applies in particular to very small anatomical functional units and very large tissue volumes, which hitherto have been deprived of a sufficient "restitution ad integrum" with conventional techniques.

By means of the device/method according to the invention, in-vivo processing and production of the 3D polymer structure is possible even for those groups of patients whose risk profile has hitherto restricted or not permitted invasive therapy procedures.

The principle of contactless heat generation through inductive power transmission by means of alternating electromagnetic fields and/or RF radiation is generally known and has been used for decades in physical medicine, as a field other than industrial manufacturing processes. The fact that the coupling of (superpara)magnetic nanoparticles to electromagnetic alternating fields in the human body can produce biologically relevant and reliably therapeutic thermal phenomena is proven not least of all by the FDA approval of oncological interstitial hyperthermia.

However, an instrumentalization of this method for additive structural manufacturing and/or differentiated structure degradation in the sense of inductive polymerization of thermosensitive polymer composite preparations to form multidimensional structures or their contactless processing has never been described to date. This may be due to the fact that high-precision focusing of electromagnetic fields has only been possible up to now, even under laboratory conditions, with disproportionately high technical effort. A rough focusing, as can be achieved using frequency-coherent amplifiers, for example, is not sufficient for precise additive technologies, in contrast.

Since electromagnetic induction, however, in contrast to the established traditional methods of contactless energy transmission (UV, IR, ultrasound, LASER), does not come with undesired interference and absorption phenomena at increasing travel distance (penetration depth) or at tissue transitions, and does not have any biologically harmful potential if legal dose limits and frequency spectra are respected, and does not require a protective atmosphere or rigid mechanical guidance systems, it should be regarded as the ideal energy intermediary for contactless 3D processing and 3D manufacturing, especially for in-situ processing and biofabrication.

The extraordinary universality of MRiA (=RNI-$\Delta$) and MRiP (=RNI-$\alpha$) bears disruptive potential in the field of processing and manufacturing 3D structures.

The device according to the invention and also the method (MRiP/MRiA) for processing or generating the 3D polymer structure now provide for the first time a practicable approach to how inductive energy depositions can also be realized, modulated and used in a targeted manner for controlled structure degradation and/or controlled additive structure built-up by means of non-directional alternating electromagnetic fields (RF field). This enables inductive manufacturing.

In their natural state, all sufficiently small paramagnetic substances, in particular superparamagnetic nanoparticles, for example nanoparticulate magnetite particles, as nano-oscillators, have their own, individually unique, minimum oscillation moment defined by their electromagnetic milieu and their individual energy content. In a homogeneous static magnetic field whose field strength is a multiple of the electromagnetic environment of the oscillators, all oscillators align their rotational moments parallel or antiparallel to the magnetic field lines of the static field, and can be excited to thermogenic oscillations by an external RF field with a frequency that corresponds to the resonant frequency $f_0$ of the paramagnetic oscillators, or substantially corresponds thereto.

The steepness and speed of the dynamic gradient fields of the device can be specified in at least 3 spatial directions in order to define the respective voxel dimension (spatial/temporal) and the voxel distribution (spatial/temporal).

According to the invention, the working zone of the device can be arranged within an enclosure or housing of the device. In this way, a defined working environment can be provided and maintained for processing/creating the 3D polymer structure. For example, the temperature, the composition of the atmosphere (=working atmosphere), the atmospheric pressure in the working zone and also the humidity of the working atmosphere directly surrounding the working zone can be adjusted as required in a simplified and cost-effective manner. The enclosure can be made of plastics, for example in the form of a plastic film, glass or another material suitable for MRI.

Particularly preferably, the device has a pump by means of which the working zone can be filled with a working atmosphere specified for the respective production process and/or a subatmospheric pressure and/or an approximate vacuum can be built up in the working zone.

According to the invention, the device can have a temperature control appliance for controlling the temperature of the working zone and/or the 3D polymer structure/polymer precursor arranged in the working zone. By means of the temperature control appliance, the 3D polymer structure/polymer precursor can be cooled as needed in order, for example, to counteract an undesired uncontrolled polymerization of the polymer precursor outside the voxel selected/destined for polymerization before and/or during the production of the 3D polymer structure.

However, the working zone or the 3D polymer structure/polymer precursor arranged therein can also be heated by means of the temperature control appliance as needed. These can thus be "initiated"—as already mentioned above—in order to promote their respective differentiated destruction (=depolymerization) or polymerization.

Polymer Precursor:

The invention also relates to a polymer precursor having at least one (super)paramagnetic substance for producing (=generating) the 3D polymer structure.

According to the invention, the polymer precursor comprises monomers and/or oligomers and/or polymers which polymerize by way of thermal polymerization, i.e., by exposure to thermal energy.

The polymer precursor and thus the 3D polymer structure can in particular comprise so-called biopolymers. These are characterized by high biocompatibility, high bioactivity and cell binding capacity. According to the invention, for example, polysaccharides, glycosaminoglycans, polypeptides and/or proteins are suitable here. Especially alginates, hyaluron, collagens/gelatins, chitosan, fibrin, silk fibroin, cellulose and even derivatives of the human extracellular matrix (ECM derivatives) and so-called (bio)artificial polymers are conceivable. Biopolymers such as marine collagens, for example from fish waste (fish gelatine metacrolyl=FGelMa), are also conceivable.

Artificial polymers, in turn, have a high mechanical stability and precisely modulatable properties (e.g., defined degradation rate). Conventional materials of biotechnology+pharmacology, as well as increasingly established substances of the plastics processing industry, can be contemplated as well, of which some suitable materials are mentioned in the following:

- PLA (polylactic acid), PEG (polyethylene glycol), PCL (polycaprolactone; a very good starting material for inorganic bioceramics), PGA (polyglycolic acid),
- PLGA (poly(-lactide-co-glycolide), PEO (polyethylene glycol), PPO (polyphenylene oxide), PU (polyurethane), PEEK (polyether ether ketone), polyamides (nylon; +/−polyester), PCU-Sil (polycarbonate-based urethane silicones), PUU (poly-urethane urethanes), SMP (shape-memory polymers), acrylonitriles (e.g., ABS: acrylonitrile butadiene styrene), block copolymers, liquid crystal polymers.

In order to use the advantages of both groups, the polymer precursor/3D polymer structure according to the invention can comprise a multi-material mix (e.g., PEG-collagen hydrogels).

The paramagnetic substance preferably comprises paramagnetic particles, in particular in the form of paramagnetic micro- or nanoparticles. The paramagnetic substance is preferably highly specific frequency-selective, i.e., can be excited to oscillation movements by irradiation of an RF field with a defined frequency or a defined frequency band. As a result of these oscillatory movements of the paramagnetic substance a thermogenic energy input into the polymer precursor can be achieved for polymerization of the polymer precursor.

The concentration of the aforementioned particles is preferably >1000 particles per cubic millimeter of the polymer precursor, in particular >10,000 particles per cubic millimeter of the polymer precursor. This ensures a reliable and homogeneous polymerization of the polymer precursor in each spatially encoded voxel of the polymer precursor during the manufacturing process. Depending on the 3D polymer structure to be produced from the polymer precursor and/or the composition of the polymer precursor, the concentration of the particles can be adjusted accordingly. According to the invention, the concentration of the particles can be up to $10^{17}$ particles per cubic millimeter of the polymer precursor. As a result, even smallest 3D polymer structures can be additively manufactured with an unprecedented level of detail.

According to the invention, the (super)paramagnetic substance preferably comprises (nanoparticular) metal particles. The particles can, for example, be made of magnetite ($Fe_3O_4$) or a silver halide ($Ag_nX_n$). In the nanoparticulate range, the particles of a ferromagnetic or ferrimagnetic material exhibit paramagnetic or superparamagnetic properties.

Nanoparticulate magnetite particles or greigite particles (Fe3S4) are found in so-called magnetosomes, for example in bacteria or fungi. These magnetosomes formed by biomineralization are characterized by a particularly small dispersion of the average particle size of their nanoparticulate particles. Within the scope of the invention, such magnetosomes, preferably purified or optionally with the prokaryotic/eukaryotic cells in which the magnetosomes are contained, can be used as a paramagnetic substance. Although the known magnetosomes comprise nanoparticles of a per se ferromagnetic material, the nanoparticles show paramagnetic or superparamagnetic properties at a size of less than about 50 nm. cf. in this respect e.g., Manucci S et al (2018) Magnetosomes extracted from Magnetospirillum gryphiswaldensae as theranostic agents in experimental model of glioblastoma. Contrast Media Mol Imaging; Jul. 11, 2018:2198703. doi: 10.1155/2018/2198703.

Heinke D et al (2017) MPS and MRI efficacy of magnetosomes from wild-type and mutant bacterial strains. Int J Mag Part Imag Vol 3 No 2 (2017), pp. 1-6) Article ID 1706004.

According to one embodiment of the invention, the paramagnetic substance is preferably suspended in the polymer precursor. A distribution/suspension of the paramagnetic particles in the polymer precursor that is as homogeneous as possible is advantageous.

According to an alternative development of the invention, the paramagnetic substance can also be bound at least partially or completely to monomers/polymers of the polymer precursor. Such metal organyls or organometallic compounds generally have a polar covalent bond between a carbon atom and at least one metal or electropositive element atom.

According to a particularly preferred further development of the invention, the paramagnetic particles of the polymer precursor/3D polymer structure can differ from one another at least partially in their material properties or in their specific chemical composition and/or size.

With regard to the biocompatibility, transductivity or thermogenicity of the particles, these can each have a (predetermined) coating. The coating of the particles can comprise titanium, for example. Other biocompatible coating materials are also conceivable, such as polyetheretherketone (PEEK), polyetherimide (PEI), polycarbonates, acrylonitrile-butadiene-styrene, polylactides (PLA), polyhydroxyacetic acid, polyglycolic acid.

The polymer precursor/3D polymer structure can furthermore (in addition to the paramagnetic substance) comprise one or more additives (=additiva) according to the invention. The additives may be organic and/or inorganic additives.

The capacity of optional biological, chemical, physical and pharmaceutical additives should by no means be underestimated. These serve, for example, as inducers, promoters, catalysts and terminators of (bio)chemical reactivity, the homogenization and stabilization of the medium or resonance conditions and thus also the artifact reduction. Likewise they can lead to an increase or decrease in electrical or thermal conductivity or insulation within the polymer precursor, thereby positively or negatively influencing the polymerization, protecting sensitive internal and external zones and, optionally, simplifying the post-processing.

In particular, nanoparticles, in the smallest amounts, can dramatically change the original properties of materials and their end products, functionalizing and (bio-)activating them (e.g., Au, Ag, montomorillonite, laponite, hectorite, silica, Fe2O3, Fe3O4, graphene, graphene oxides, nanocellulose, LDHs (layered double hydroxides, pyrroles, . . . ).

According to a development, the additives can function as adsorbents, be it for binding or converting toxic or counterproductive metabolites and catabolites, undesirable messenger substances or pain mediators, for example to prevent immunological defense and sensitization cascades or infections.

Suitable additives can allow to influence the rheological properties, among others the surface tension of the polymer precursor, in order to maximize its injectability and microadhesiveness.

Other suitable additives in turn can help to specifically modulate or limit the final consistency of the 3D polymer structure (e.g., fillers). Equally worth mentioning are additives in the form of biologics for cell activation and control such as growth factors and immunomodulators (e.g., interferons), radiomodulators to enhance radiotherapies and cytostatics, but also visualization aids such as contrast agents or other contactless externally detectable and quantifiable marks.

The aggregates can therefore be selected in particular from the group of: fibers; dyes; antibacterial substances; growth factors; nanoparticles/tubes; mineral fillers (e.g., tricalcium phosphate cement, nano-hydroxyapatite, bioactive glass); metallic materials (e.g., silver, gold, magnetites (Fe2O3, Fe3O4)—e.g., SPION=superparamagnetic iron oxide nanoparticles, Gd chelates/conjugates); Glycosaminoglycans; so-called MMC substances (for so-called macromolecular crowding; e.g., dextrans or ficol(=sucrose-epichorhydrin copolymer)); Polypeptide motifs such as -RGD sequences (arginine, glycine and aspartic acid), which are present, for example, in proteins of the extracellular matrix (e.g., in fibronectin and vitronectin); -IKVAV+-YIGSR (laminin) and; Promoters; Terminators; Inhibitors; Catalysts; Sensitizer; Immunomodulators (such as VGF or the JNK3 molecule)

The above-mentioned additives can be freely dissolved, substance-bound or temporarily fixed to transport molecules or in thermosomes.

The polymer precursor can in particular have a liquid or gel form. Particularly preferably, the polymer precursor has a viscosity of between $10^2$ and $10^6$ mPa·s.

According to the invention, the polymer precursor can also be present in the form of a so-called "squid". Such squids are otherwise preformed, incompletely cured polymer precursors.

According to a preferred development of the invention, the polymer precursor is non-toxic to humans. As a result, the polymer precursor can be used in the human body for in-vivo 3D fabrication.

Very particularly preferably, the polymer precursor is degradable in the non-polymerized state in the human and/or animal body, for example by the endogenous enzymes.

Manufacturing and Processing System According to the Invention

The manufacturing and processing system according to the invention comprises a device described above as well as the polymer precursor or the 3D polymer structure.

MRiA Procedure (=RNI-Δ Procedure):

The method according to the invention for processing the 3D polymer structure has the following steps:

a. defining CAD/CAM data of the 3D polymer structure;
b. providing the 3D polymer structure;
c. insertion of the 3D polymer structure into the working zone of the device described above;
d. spatially encoding a voxel V within the 3D polymer structure as a function of the CAD/CAM data by applying magnetic gradient fields;
e. destroying the 3D polymer structure, preferably solely, in the at least one spatially encoded voxel V by irradiating RF radiation by means of which the paramagnetic substance in the respective voxel V is excited to destructive thermogenic oscillations; and
f. Preferably repeating steps d) and e) for further voxels within the 3D polymer structure, i.e., sequential three-dimensional spatial-encoding of further, preferably spatially adjacent, voxels V in the 3D polymer structure as a function of the CAD/CAM data and destruction of the 3D polymer structure, preferably alone, in the respective further spatially encoded voxel(s) V by irradiating (110) RF radiation (42), by means of which the paramagnetic substance (32) in each of the further voxels V is excited to (polymer-)destructive thermogenic oscillations.

According to a particularly preferred further development of the invention, the method for processing the 3D polymer structure comprises the following further steps, which preferably precede the provision of the 3D structure:

g. arranging of a polymer precursor comprising a paramagnetic substance, preferably homogeneously distributed, in the working zone of the device;
h. spatially encoding a voxel V within the polymer precursor as a function of the CAD/CAM data by applying magnetic gradient fields $B_1$, $B_2$, $B_3$ in at least all three spatial directions x, y, z;

i. polymerizing of the polymer precursor, preferably solely, in the at least one spatially encoded voxel V by irradiating RF radiation by means of which the paramagnetic substance in the respective voxel V is excited to oscillations; and j. subsequently sequentially spatially encoding further, preferably spatially adjacent, voxels V in the polymer precursor as a function of the CAD/CAM data, and k. polymerizing of the polymer precursor in the respective further spatially encoded voxels V by irradiating RF radiation, by means of which the paramagnetic substance in the respective further voxel V is excited to thermogenic oscillations.

The latter embodiment is therefore a combined manufacturing or production and machining process.

It should be noted that the processing steps described above and the polymerization-related steps can alternate, optionally iteratively. This allows the fabrication of even the most complex 3D structures.

In the method according to the invention, the three-dimensional spatial resolution is based on the inductive magnetic resonance phenomena of an interplay of electromagnetic resonance isolation and resonance stimulation. Diagnostic and analytical MR methods use this strategy. However, no specific resonance-frequency-selective, thermogenic, paramagnetic nanoparticles have hitherto been used, which are set into a thermogenic oscillation by RF excitation and thus induce a local destruction of the 3D polymer structure or a polymerization of the polymer precursor, i.e., induction of chemical bonds in the thermosensitive polymer precursor, limited to the spatially encoded voxel of the polymer precursor.

The method proposed here allows a continuous volume-graduation of the destruction of the 3D polymer structure or the polymerization (smaller, equal to and larger than a conventional layer dimension) of the polymer precursor, i.e., both, a high-precision punctiform, and also “en bloc” destruction of the 3D structure or polymerization and thus curing of the 3D polymer structure to be produced.

This paves the way to efficient 3D processing and production of any structures, especially bio-artificial structures.

The precise RF stimulation of frequency-selective thermogenic nano-oscillators in electromagnetic resonance niches, which are generated in a location-specific manner, preferably also on the basis of high-resolution image data, by targeted superposition of magnetic gradient fields within the at least partially polymerized/polymerized 3D polymer structure or a more or less liquid thermosensitive polymer precursor, enables, as already explained, the processing and production of 3D polymer structures of any geometry, configuration and complexity—depending on the materials used, also of any consistency—individually in vitro and also in vivo. The strategy of processing a 3D polymer structure by breaking down the smallest possible subunits or building it up from the smallest possible subunits results in maximum design freedom and adaptability.

This is achieved at a previously unattainable level of detail and speed. The process can open up new avenues for the processing and production of articles of daily use, machine elements, medical products, especially in medical and biotechnological biofabrication, and even in in-situ bioprinting. This especially also because the process according to the invention (MRiP) enables a precise surface design and seamless linking or anchoring with other structures. As a result, a simplified and more reliable vitalization by passive/active cell colonization can be promoted, when the 3D polymer structure is implanted. In the medical context, MRiP/MRiA can enable the creation of implants that repair, reconstruct, respect, correct and optimize the integrity and interactivity of functional anatomical overall structures in order to stimulate and amplify natural regenerative processes.

A rough focusing, as can be achieved, for example by means of frequency-coherent amplifiers, is not sufficient for precise subtractive/additive technologies. In contrast to the established traditional methods of contactless energy transfer using UV/IR radiation, ultrasound or LASER, electromagnetic induction does not display relevant undesirable interference and absorption phenomena, neither with increasing travelling path in the 3D polymer structure/polymer precursor or in the tissue (penetration depth) nor at material transitions. In addition, electromagnetic induction does not have any biologically harmful potential within legal dose limits and frequency spectra; and no protective atmosphere or rigid mechanical guidance systems are required per se. Therefore it can be regarded as an ideal energy mediator for contactless in vitro and in vivo biofabrication.

The method according to the invention now offers for the first time a practicable approach to how inductive energy depositions by means of undirected alternating electromagnetic fields (RF field) can be realized in a location-specific manner, modulated and used specifically for controlled subtractive structure degradation as well as for additive structure build-up (=“inductive manufacturing”)

In their natural state, all superparamagnetic oscillators have their own minimum moment of oscillation defined by their electromagnetic environment and their individual energy content. In a homogeneous static magnetic field whose field strength is a multiple of the electromagnetic environment of the paramagnetic oscillators, all oscillators align their rotational moments parallel or antiparallel to the magnetic field lines of the static $B_0$ field, accompanied by a synchronization of their resonance frequency sensitivity for alternating field pulses, which—in addition to the material, polarity and configuration of the oscillators—depends proportionally on the field strength of the homogeneous magnetic field. This means that, ideally, for each field strength, there exists only one specific frequency which stimulates all appropriately configured oscillators to the maximum—the so-called resonance frequency. Under resonance conditions, all receptive oscillators therefore show a maximum energy absorption capacity with regard to the specific radio-frequency alternating field, resulting in a significantly increased oscillation movement, which is converted into thermal energy due to resistance and friction effects with a minimum coupling distance. As in nuclear magnetic resonance tomography for slice selection and location coding, dynamic gradient fields in at least 3 spatial directions serve MRiA/MRiP for “indirect focusing” of these radio-frequency pulses. These magnetic fields are characterized by a continuous increase or decrease of the respective magnetic field strength along their characteristic axes [x, y, z], relative to the static permanent magnetic field and the polymer precursor exposed to the magnetic fields in the working zone.

A gradient field introduced by special coils in the x-axis thus superimposes on the previously homogeneous permanent static $B_0$ field and thus leads to a linear increase or decrease of the total static field strength along the x-axis. If technically feasible, steeper non-linear gradients would be advantageous in order to amplify the differentiation of neighboring voxels. The same applies for each introduced gradient field along the y-axis and z-axis, with the result that each defined voxel of the total volume of the working zone and thus of the 3D polymer structure/polymer precursor, or theoretically each oscillator in three-dimensional space has its own individual electromagnetic niche at the point of intersection of the at least three gradient fields.

Thus, if the magnetic microenvironment of each oscillator—or voxel—differs linearly from the magnetic microenvironment of its neighboring oscillator—or voxel—in all spatial directions, then each individual oscillator—or each voxel—has its own individual resonant frequency and can consequently be individually addressed and selectively excited. In this case, the steepness of the gradient fields defines the edge lengths of the voxels in all 3 spatial directions, ideally by simultaneous total superposition of their local field strength, alternatively sequentially, e.g., using the inverse Fourier transformation. In contrast to all conventional subtractive/additive methods, either individual voxels or contiguous volume units can be polymerized “en bloc” in this way, in the sense of multi-voxel processing.

Instead of a single external heat source, each nano-oscillator thus represents an autonomous heat source in itself (with minimal coupling distance), whose effect without addressing gradient fields would result in a three-dimensional thermal grid-type heating pattern made of initially multiple isomorphic and isothermal heat islets with temperature maxima directly around each individual oscillator. In an otherwise closed, perfect system, the characteristic power absorption of the oscillators, their efficiency and the material-specific heat conduction of the 3D polymer structure/polymer precursor define the dimension, dynamics and duration of the heat propagation up to the point in time at which a globally homogeneous heating of the total volume is achieved, depending on the pulse intensity and pulse periodicity, which can be continuously controlled by the user in real time.

In practice, thermal conduction phenomena lead to a centrifugal temperature drop around each stimulated oscillator, corresponding to a thermodynamic penumbra that depends on the surrounding conditions. With increasing excitation over time these thermal islets tend to conflux, to equalize or to mutually amplify each other.

By proactively using the principles described and the influencing factors listed below, these effects can be locally amplified or reduced by the user by focused stimulation of individual oscillators (groups) in order to selectively or zonally modulate the final heat patterns and consecutively the detail resolution and target properties of the product (e.g., functionality, durability).

Differences in the resonance susceptibility therefore allow a targeted spatially selective excitation of thermogenic nanooscillators (=paramagnetic substance) (in vitro and in vivo) and, consequently, high-precision processing and production of complex 3D polymer structures on the basis of differentiated energy absorption patterns and location-specific reproducible temperature profiles by controlled variation of the spatial and temporal resonance conditions. In addition to modulating the internal polymer cohesion, the thermal effects of electromagnetically inductively stimulated nanooscillators also allow to control the adhesion of the 3D products by microscopic structural interlocking (microadhesion) on foreign surfaces-provided that the rheology of the polymer precursor is primarily appropriate.

For implants, these effects can be supplemented by discontinuous thermocoagulatory adhesive effects in the transition zone to the organism (interface), which ideally result in continuous, seamless regenerative healing. In vivo, this can be flanked by reparative post-inflammatory or focal post-necrotic interconnective scar formation. In addition, site-specific inductive effects can beneficially precondition the implant bed—i.e., the wound base, e.g., through thermal microdebridement, hemostasis and denervation.

The special charm of the method according to the invention is in the subtle, multi-parametric controllability of the step-by-step degradation and build-up phases of the product structure in real time, resulting in maximum process control, customizability and result quality.

The basic prerequisite for this is a differentiated predictive calculation of the energy doses to be applied in all spatial directions for temperature-dependent material destruction or material solidification. The modulation of the energy dose transmitted per volume unit is achieved primarily through the target-oriented adjustment of the electromagnetic induction parameters and the temporospatial algorithmic variation of the resonance conditions, which results from the interaction of the static magnetic field with the dynamic magnetic fields.

Here, non-directional RF stimulation pulses—for example with a wavelength in the multi-digit centimeter range (MRI diagnostics)—can easily selectively excite voxels in the submillimeter range without any relevant attenuation of the irradiated electromagnetic energy due to travel path distance, interfaces or phase transitions.

According to a first embodiment of the invention, the resonance susceptibility of each individual nano-oscillator can be sequentially adapted by a targeted variation of the gradient steepness and strength to a constant stimulation frequency, with a stimulation pulse which is always at a constant frequency.

According to an alternative embodiment, the frequency of the stimulation pulse can be variably adapted sequentially in a targeted manner to the individualized resonance susceptibility of each voxel at given continuously constant gradient properties.

While the first-mentioned embodiment has been used successfully in the spatial encoding of diagnostic magnetic resonance tomography for decades, frequency modulation technologies are used in industrial inductive metal and plastics processing, albeit without the use of addressing gradient fields. The technical design variant 2 is still very technically complex at the present time.

A permanent magnet, a superconducting magnet, an electromagnet or a resistance magnet can be used to generate the $B_0$ field, which serves the homogenous orientation of the paramagnetic substance, i.e., the paramagnetic nano-oscillators, parallel or antiparallel to the magnetic field lines, and the homogenization of their field-strength-dependent susceptibility for their characteristic, resonant inductive frequency pulse. Accordingly, the device can have a magnet designed in the manner above. The field strength of the (static) $B_0$ field, according to the invention, can be ≤3 Tesla or also ≥3 Tesla. Very particularly preferably, the field strength of the B0 field is ≥10 Tesla. Although magnetic resonance tomography with respect to the image (data) or image-based morphological monitoring of the production process is to be regarded as a gold standard, the field strength of the $B_0$ field according to the invention can be mT range, or greater.

The gradient fields for spatially encoded addressing of the paramagnetic substance of the individual voxels are generated by means of gradient coils in ≥3 spatial directions. These gradient fields are switched on sequentially (for a short time), whereby their field strength continuously increases or decreases along their respective spatial axes.

As a result, a location-specific attenuation/amplification of the static $B_0$ field, and thereby a location-encoding of the RF-susceptibility of the paramagnetic substance in three-dimensional space are achieved by cumulative generation of magnetic micro-environments (resonance niches). In principle, the greater the increase in rise and the shorter the rise time, the better the detailed resolution of the processing or polymerization process. If en-bloc processing or polymerization (i.e., the polymerization of a plurality of voxels or a larger volume of interest) is desired, flat gradients, i.e., flat rise intensities, are advantageous.

The radio-frequency field generator (=radio-frequency unit) serves to excite the paramagnetic substance or oscillators (under resonance conditions) by means of RF radiation. For this purpose, the radio-frequency unit can have an RF transmission amplifier and at least one RF transmitter coil. The RF unit can be integrated into the housing of the device. Alternatively, the RF transmitting coil can be designed in the form of a mobile RF coil that can be freely positioned relatively to the working zone of the device. For example, an anatomically ergonomic surface coil and a coil that can be placed intracorporeally (e.g., endorectal coil or a catheter-mounted coil) can be considered here.

According to the invention, the radio frequency unit can also have a plurality of RF coils in the form of array coils.

The duration of action of the RF radiation is to be selected to be as low as reasonably achievable (=ALARA), whereby the whole-body SAR values must be respected.

According to the invention, the frequency/phase/amplitude of the RF radiation is tuned to the characteristic resonance frequency of the (super)paramagnetic substance or nanoparticles (oscillators) to be excited at a given target field strength of the superposed magnetic fields (=static magnetic field+3 gradient fields) in the respective voxel. The aim is maximally inductive, maximally selective excitation of the superparamagnetic substance or superparamagnetic nanoparticles (oscillators) of each, single addressed voxel under resonance conditions.

According to the invention, the intervals between the irradiations of the RF pulse (pulse periodicity) are preferably defined as a function of the following factors: Thermogenicity (=characteristic power absorption+thermal efficiency) of each individual oscillator or their thermogenic sum/voxel; thermal transition threshold(s) of the polymer material of the 3D polymer structure to decomposed polymer material (cf. e.g., glass transition region) or the polymer precursor to the (partially) polymerized polymer material; Thermal conductivity of the prepolymer or polymer material; Destruction and polymerization kinetics (material-specific/architectural-specific); Destruction or polymerization pattern (see CAD); e.g., degree of resolution, heat bridges/accumulating subunits (spatial pulse density, temporal pulse density); (=modulation of the energy input via temporospatial pulse algorithms); If necessary, pulse amplitude/angle of incidence with respect to the voxel to be excited;

The interval periodicity and/or pulse train length of the RF stimulation is primarily defined by the thermodynamic effects in the predefined setting and if necessary limited by the maximum speed of the control unit+magnetic field gradients in order to switch between 2 precise 3D voxel resonance isolations ("indirect focusing").

According to the invention: in principle, virtually any interval between the individual pulses of RF radiation can be present, provided that the voxel-specific or VOI-specific (volume of interest) energy input individually or as a sum produces the desired thermal effect in the voxel/VOI; with maximal fast voxel (or VOI) resonance isolation (target coding) also a continuous RF radiation (RF pulsation) is theoretically possible, as in principle only those oscillators for which resonance conditions prevail oscillate thermogenically; a fractionated pulse algorithm, e.g., with repetitive RF radiation cycles, is possible for in-vivo processing/manufacturing of the 3D polymer structure, which is advantageous from a thermodynamic point of view and enables minimizing the global RF and thus energy irradiation into biological tissue.

According to the invention, the (field) frequency of the RF radiation irradiated into the working zone can in principal be in the kilohertz to teraherz range. Particularly preferably, the RF frequency is between 1 KHz and 789 teraherz (THZ), most preferably between 100 KHz or 108 Khz up to 100 MHz.

The control unit of the device serves the following tasks: a. system control/monitoring; b. data management; c. CAD unit; d. Image acquisition/analysis/reconstruction.

It goes without saying that the control unit can have application software with AI properties.

The detailed resolution of the polymer 3D polymer structure depends on:

a. the properties of the paramagnetic substance/particles and/or (super)paramagnetic nano-oscillators, such as their: frequency selectivity; characteristic power absorption; thermal efficiency. These properties can be determined experimentally for the respective paramagnetic substance or the nano-oscillators.
b. the concentration and the distribution pattern of the paramagnetic substance in the polymer precursor.
c. the steepness and speed of the dynamic gradient fields generated by the gradient coils in the 3 spatial directions: voxel dimension (spatial/temporal); voxel distribution (spatial/temporal).
d. the radio-frequency generator with respect to the
e. the specificity and homogeneity of the inductive RF radiation; (position, width, amplitude, (questionable angle of incidence relative to the main magnetic field)
f. spatial and temporal distribution of the RF radiation (=RF pulses) (pulse algorithm)
g. 3D heat pattern
h. destruction kinetics/polymerization kinetics (e.g., transition thresholds)
i. material-specific thermodynamic phenomena
j. architectural-specific thermodynamic phenomena A decreasing detail resolution of the method from one procedural level to the next must also be considered: constructive resolution (CAD); electromagnetic (inductive) resolution; thermal resolution; temporal resolution; polymer resolution; structural resolution; diagnostic resolution (imaging, e.g., MRI); post-processing resolution (dependent on the method).

In clinical use, in this context, the transition zone of the polymer composite to the surrounding tissue presents particular challenges, since significant thermal losses occur here due to tissue-specific heat dissipation, absorption and perfusion phenomena—and possibly also movement artefacts. In addition, relative and absolute thermal tolerance thresholds of biological tissue must be respected.

Ultimately, the limiting factor of the resolution capacity of diagnostic MRI will always be the signal-to-noise ratio, i.e., the number of excited protons or the sum of their acquirable provoked echoes per volume unit relative to the ambient noise. This is because the stimulative radio-frequency pulses of the MRI—apart from presaturation pulses-always excite all protons of a slice or in the entire preselected 3D examination volume, and the exact spatial encoding takes place not until the readout step. In contrast, according to the invention, ideally only the oscillators of those preselected (=resonance-isolated or resonance-vulnerable) voxels of the 3D polymer structure/polymer precursor are specifically excited which are to be decomposed (destroyed) or cured as part of the 3D polymer structure according to the construction plan.

According to the invention, the gradient fields are thus primarily activated prospectively, whereas conventional MRI sequences initially define slice orientation and thickness within the examination volume by means of only 1 gradient field (usually z-axis) and only after the RF pulse, at the time of echo readout are further gradient echoes (usually x-, y-axis) switched on for retrospective spatial encoding. While repetitive stimulation cycles are indispensable for the analysis of the MRI sum echoes by means of Fourier transformation—and lead to an undesired increase in the energy absorption doses—MRiA/MRiP moderates the energy dose in a targeted manner via temporospatial pulse algorithms.

In general, the resonance frequency of the oscillators in the manufacturing process should be deliberately selected to be unequal to the proton resonance frequency in order to avoid heterotopic polymerizations and/or depolymerizations (polymer destruction) by MRI control images. An exception are certain preformed "squids", e.g., 3D polymer structures in the form of thermoresponsive stents/cages/cava filters, coils/occluders, heart valves, vascular endoprostheses, thermoresponsive bone cement or tissue adhesives.

Further developments of the method could also benefit from a combination of different oscillator types with corresponding frequency variation. After all, high frequencies are known to lead to a steeper rise in temperature in the immediate vicinity of the oscillator, while low frequencies lead to a gentle, homogeneous, global warming of the wider surroundings. However, corresponding effects could also result from varying the angle of incidence a in the monofrequency pulse setting.

While morphological features <200 μm cannot be imaged sufficiently in routine clinical MRI diagnostics, MRIA/MRiP and/or the device according to the invention will be able to subtractively generate or to additively generate structures (e.g., pores) that are smaller by powers. This is in an order of magnitude relevant for cell navigation, cell control and the histogenetic determination for spatial and temporal control of tissue regeneration.

The result of MRiA/MRiP can be further improved not least by repetitive real-time image acquisition, e.g., on the basis of robust MRI sequences, alternatively also by other imaging appliances/procedures of comparable spatial resolution (e.g., surface LASER scanner, DVT, MPI etc.).

Use of the Device According to the Invention

The above-explained device can be used universally in the fields of technology and medicine. In particular, it can be used to process/produce a medical implant, especially a bone substitute, a supporting scaffold for an organ or tissue, or a vascular prosthesis.

Specifically

Use in Human, Dental and Veterinary Medicine:

- Plastic radiology: stabilization of tissue/generation of spacers; reconstruction of tissue/tissue replacement; adaptation/anchoring/embolization; augmentation/conturing/enhancement; compartmentalization/encapsulation, e.g., of pathological processes/masking.

Subtle initial damage can be contained and/or remedied at the earliest possible stage and vulnerable tissues at individual particular risk can be augmented a priori, with the potential to systematically prevent signs of wear and tear—e.g., in competitive sport—and thus, including but not limited, work-related early invalidity, resulting in enormous health and economic benefit.

Reparative & Reconstructive Radiology:

In addition to the specific replacement of connective and supporting tissues (cartilage, bone, tendons, ligaments), the device is suitable for both, plastic reconstruction, functional and aesthetic shaping and shape correction as well as for diffuse tissue stabilization in cases of primary and secondary tissue tone losses.

The polymer precursor and/or the 3D polymer structure produced thereform can furthermore be used as a binder in fracture zones and arthrodeses, as an adhesive for the treatment of acute wounds and as a bioactive protectorate for chronic wounds, as a mesh substitute in hernioplasty and as a placeholder, guiding structure and support material for cellular structures and/or acellular additives and active ingredients.

Furthermore, the invention allows the synthesis, anastomosis, stabilization, adaptation and occlusion of cavities in vivo, including valve, sphincter and shunt systems, largely independently of their dimensions, configuration and position. For the first time, this promises individualized curative strategies for a large number of hitherto unsatisfactorily treatable chronic diseases such as PAOD, lymphedema and chronic venous insufficiency, and should also significantly improve the outcome of classic (microvascular) grafts and acral limb-replantation.

The invention can also be used to optimize the biomechanical coupling of prostheses and one day in the distant future even to reconstruct and link neuronal conductive structures intracorporeally in a targeted manner.

In particular, however, the invention allows the interface between a wide variety of tissues and materials to be authentically created in situ in order to achieve optimal structural integrity, force direction and transmission. These can be precisely modulated at any time and can be adjusted repeatedly to differing individual load profiles and complex movement patterns of each patient, by real-time image-guided modulation of the process parameters of the device, as well as by non-invasive and invasive post-processing.

The invention can be used for gentler and at the same time more efficient anchoring of an implant, in particular a joint endoprosthesis. In the event of wear, the device and the polymer precursor can be used in vivo to recoat the endoprosthesis.

The invention can also be used to produce a large- or full-surface bioartificial cartilage substitute in situ.

Captive Radiology:

The device/the 3D polymer structure can be used for risk management and for limiting complications of tumorous and inflammatory diseases by sealing off affected anatomical compartments by means of the 3D polymer structure. As a result, such pathological processes can be treated inside an isolated "neoanatomical" space, e.g., chemo- or immunotherapeutically, radio-oncologically or thermally- or be palliatively confined.

Since the metastasis probability increases with increasing tumor surface area, even an incomplete encasement of tumors by means of the 3D polymer structure generated in vivo is likely to be associated with a relative prognostic benefit. The artificial polymer sheathing can also serve as a guiding structure for a biopsy, as an orientation aid during tumor resection, as a solidified safety margin and generally as a spacer or a protective shield for vulnerable structures. The 3D polymer structure can be depolymerized non-invasively and contact-free by means of the device, i.e., it can be degraded into suctionable, absorbable and/or excretable degradation products when it is no longer needed.

Manufactive Radiology:

The device and/or the polymer precursor can be used for in vivo fabrication of 3D polymer structures in the form of guiding elements, anatomical (e.g., electroconductive) guidewires and polymer 3D rail networks, but also for bioartificial sensor technologies and conductor systems. This can further advance the emerging automation of medical therapy and diagnostics, for example by (partially) autonomous miniature robots used intracorporeally, soft robots or, in particular intracorporeally, portable electronic devices.

It should be noted that the device/polymer precursor according to the invention can be used with robotic assistance for telemedical remote control intervention (remote manufacturing), in particular using CAD design libraries, in order to close existing supply gaps and maintain critical infrastructures even in remote locations—e.g., ISS—or in crisis situations.

The 3D polymer structure can be depolymerized non-invasively and contact-free by means of the device, i.e., degraded into degradation products that can be aspirated, resorbed and/or excreted when they are no longer needed.

Depending on the site of the 3D polymer structure to be generated in vivo, the access route, rheological properties or patient variables, the polymer precursor can be introduced directly into the body and/or to the target site via cannulas, catheters, endoscopes or other appropriate instruments, whether as an infusion, injection or instillate.

One possible variant can be the ballooning-technique, i.e., the placement of at least one single- or multi-lumen—e.g., catheter-borne—balloon expander for local tissue pre-stretching, whereupon the magnetic resonance induction polymerization can take place either with direct tissue contact or primarily in the balloon lumen—e.g., in the case of substance incompatibility or the need for accompanying chemical surface curing of the respective 3D polymer structure or its forced thermal post-treatment or cooling, by means of perfusion systems. For example, in the case of substance incompatibilities or the need for accompanying chemical surface curing of the respective 3D polymer structure or its forced thermal post-treatment or cooling using perfusion systems.

According to the invention, voxels can be defined in the 3D polymer structure/polymer precursor for the machining/manufacturing process, with each having a uniform size or which differ at least partially from one another in terms of their size. By defining voxels or VOIs (volume of interest) of different sizes, even 3D polymer structures with complex geometries can be processed or produced more rapidly.

During the machining or manufacturing process, at least a portion of the voxels defined on the basis of the CAD/CAM data can be modified in terms of their spatial position in the working zone, their size and/or their geometry for the subsequent process using image data, captured by magnetic resonance tomogaphic imaging in particular. The processing or manufacturing tolerance of the 3D polymer structure can thereby be further improved.

According to a further development of the invention, the machining or manufacturing process is interrupted, preferably at intervals, in order to capture image data from the working zone, in particular from the 3D polymer structure already produced or the volume of the polymer precursor adjacent to the 3D polymer structure. The image data can be acquired in particular depending on the CAD/CAM data of the 3D polymer structure to be processed/produced.

The image data are preferably compared with the CAD data and, when a deviation of the already (partially) manufactured 3D polymer structure is detected, the CAD/CAM data for generating the remaining 3D polymer structure are modified on the basis of the image data. This allows the 3D polymer structure to be processed/produced with exceptionally tight tolerances.

According to the invention, the 3D polymer structure can be partially or completely processed within a living organism and optionally also be produced in order to be available as an implant after its removal or to fulfill its function in situ.

According to the invention, the 3D polymer structure can be a supporting scaffold for tissue, an organ, in particular a bone, a kidney, a liver, a cartilage substitute, a bone substitute or a vascular section.

Further advantages of the invention are shown in the description and the drawing. The embodiments shown and described are not to be understood as an exhaustive list, but rather have an exemplary character for the description of the invention.

BRIEF DESCRIPTION OF THE DRAWINGS

Detailed description of the invention and drawing

Figure 1:
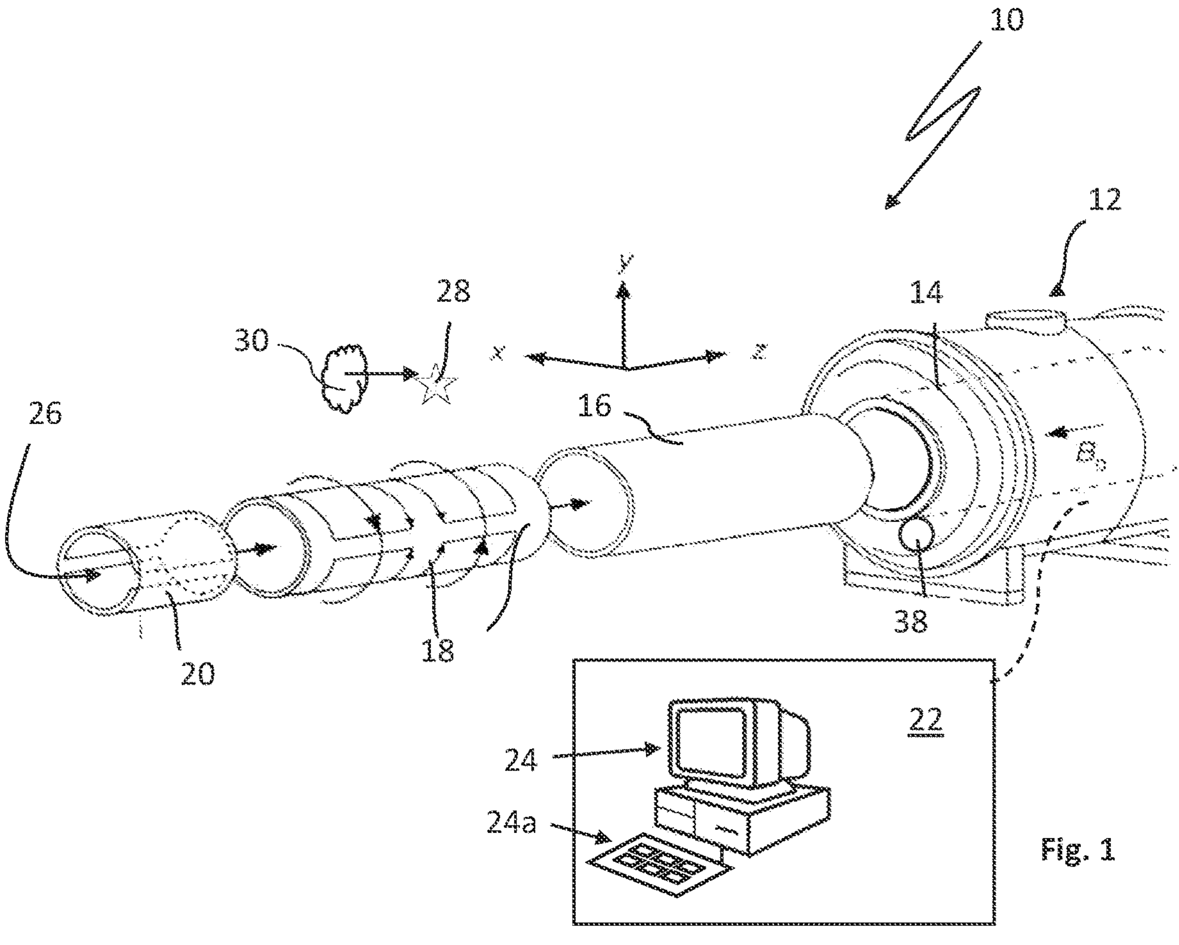
Figure 2:
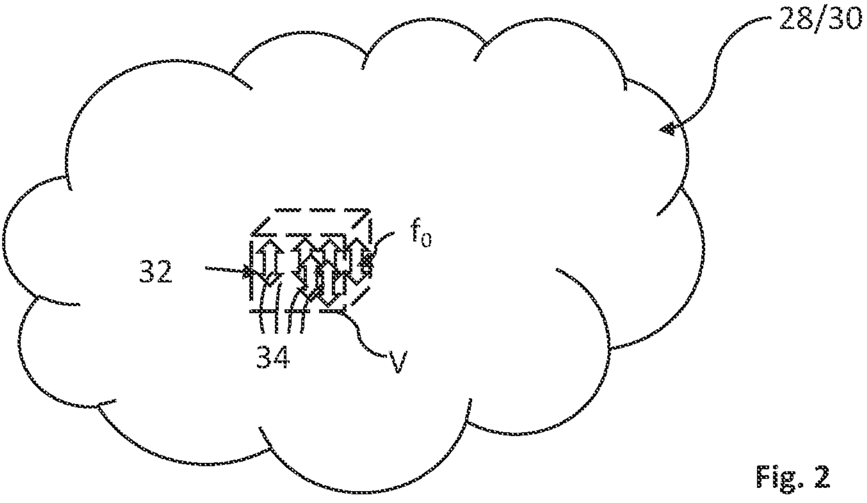
Figure 3:
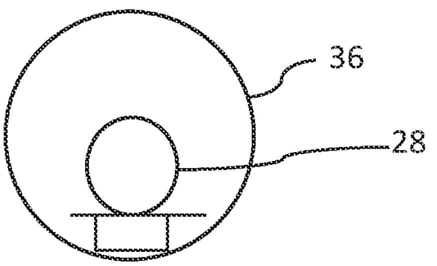
Figure 4:
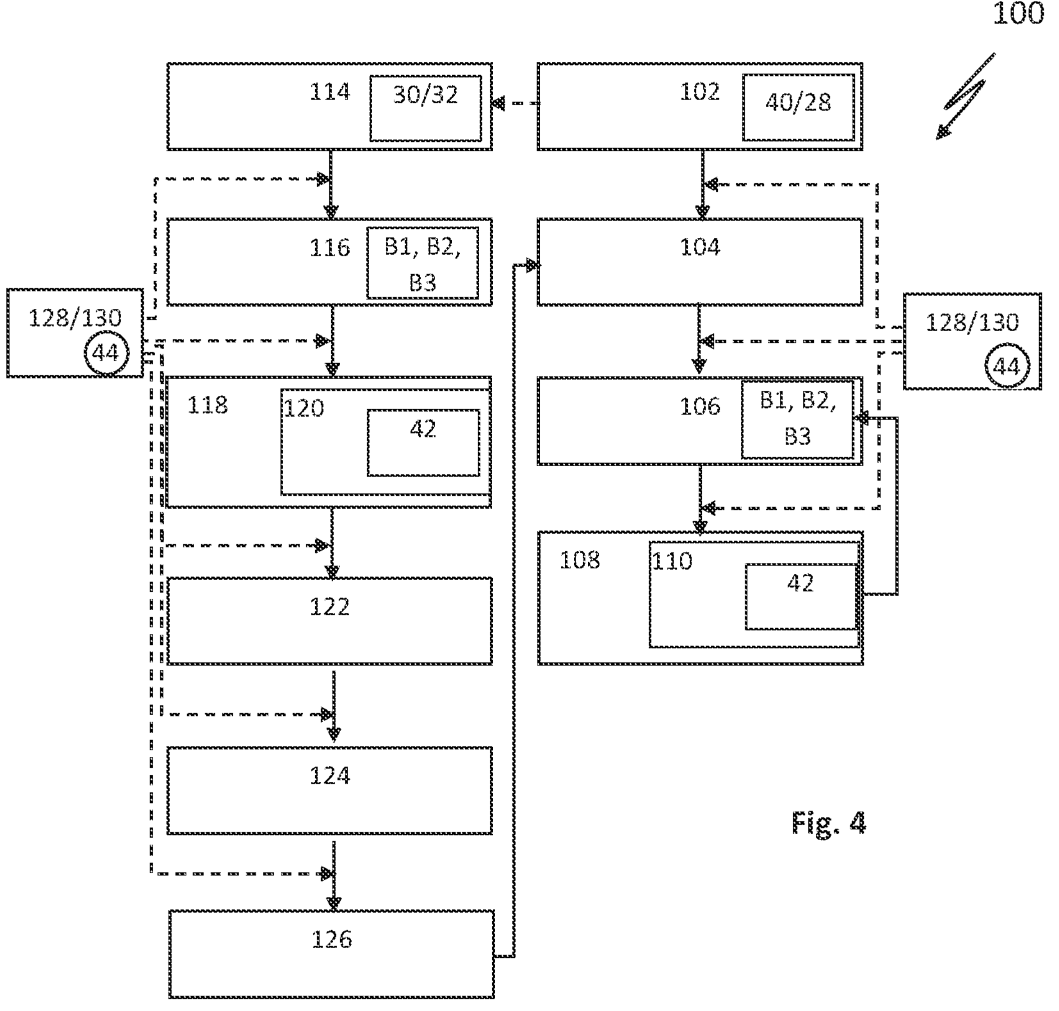

FIG. 1 is the schematic structure of a device according to the invention and with a polymer precursor or 3D polymer structure that can be arranged in the working zone of the device;

FIG. 2 is the 3D polymer structure or polymer precursor with the paramagnetic substance in a selected voxel;

FIG. 3 is a housing within which the polymer structure/polymer precursor can be arranged during the 3D machining or manufacturing process; and FIG. 4 is a block diagram of the method according to the invention for processing or generating a 3D polymer structure with its individual method steps.

DETAILED DESCRIPTION OF EMBODIMENTS OF THE INVENTION

FIG. 1 is a device 10 with a housing 12, having a magnetic field generator 14 for generating a static magnetic field $B_0$, optional shimming coils 16 and gradient coils 18, an RF field generator 20, a control unit 22 with a computer system 24 and an input and operating console 24*a*, as well as a working zone 26 arranged in the housing 12. A 3D polymer structure 28 (at least partially polymerized or polymerized) to be processed and/or a polymer precursor 30 (=a prepolymer), which serves as a starting material for the 3D polymer structure to be produced with the device 10, can be arranged in the working zone 26.

The magnetic field generator 14 serves to generate a homogeneous static magnetic field $B_0$ (hereinafter referred to as the $B_0$ field) in the working zone 26. The field strength of the $B_0$ field is greater than the earth's magnetic field by orders of magnitude. The magnetic field generator 14 can, for example, comprise a permanent magnet or a superconducting magnet. This homogeneous $B_0$ field can be modified by the gradient coils 18 in a targeted manner. The gradient coils 18 are preferably located on the circumference of the working zone 26. With these gradient coils 18, continuously increasing or decreasing magnetic fields, so-called gradient fields can be superimposed on the static $B_0$ field in at least all three spatial directions x, y, z in a defined manner.

The 3D polymer structure 28/polymer precursor 30 comprises, according to the schematic representation of a voxel V of in FIG. 2, a paramagnetic substance 32, which is preferably arranged homogeneously distributed in the 3D polymer structure 28/polymer precursor 30. The paramagnetic substance 32 is preferably formed by superparamagnetic nanoparticulate metal particles 34 (=nano-oscillators). The metal particles 34 may in particular consist of nanoparticulate magnetite ($Fe_3O_4$) or a silver halide ($Ag_nX_n$). One cubic millimeter ($mm^3$) of the 3D polymer structure 28 or the polymer precursor 30 preferably contains more than 1000, preferably more than 10,000, and up to $10^{17}$ the metal particles 34.

In the static $B_0$ field, all metal particles 34 align their rotational moments parallel or antiparallel to the magnetic field lines of the $B_0$ field. This is accompanied by a synchronization of their resonance frequency sensitivity for irradiated RF radiation or RF pulses. In addition to the material, polarity, geometry and size of the metal particles 34, the resonant frequency susceptibility depends on the field strength of the $B_0$ field. For each field strength of the $B_0$ field therefore, only one single specific frequency of the electromagnetic RF radiation exists, which maximally stimulates all metal particles configurated in the same way as oscillators—the so-called resonant frequency.

In simple (theoretical) systems without damping, the resonant frequency is equal to the undamped natural frequency (characteristic frequency) $f_0$ of the paramagnetic metal particles 34. In attenuated systems, the frequency at which the maximum amplitude occurs is always lower than the unattenuated natural frequency.

Under resonance conditions, all metal particles 34 excitable by the RF radiation thus have a maximum energy absorption susceptibility with regard to the specific alternating RF field. This results in a significantly increased oscillatory movement of the metal particles 34. These oscillation movements are converted (at the molecular level) into thermal energy due to resistance and friction effects with a minimum spatial coupling distance. This can lead to the (locally limited) destruction of the 3D polymer structure 28 or to the polymerization of the polymer precursor 30. The metal particles 34 can thus be referred to as nano-oscillators.

The dynamic gradient fields (B1, B2, B3; not shown in the drawing) of the device 10 serve in a manner corresponding to that of nuclear magnetic resonance tomography imaging for slice selection and location encoding in at least 3 spatial directions, i.e., functionally for "indirect focusing" of the RF radiation irradiated into the working zone by means of the RF field generator 20.

The gradient fields are characterized by a continuous increase or decrease in the respective magnetic field strength along their characteristic axes x, y, z, relative to the $B_0$ field. At this point, reference is made to the similar gradient fields familiar to the person skilled in the art in nuclear magnetic resonance tomography. A switched-on gradient field in the x-axis is therefore superimposed on the previously homogeneous permanent static $B_0$ field, and thus leads to a linear increase or decrease of the total static field strength along the x-axis. The same applies to each introduced gradient field along the y-axis and z-axis. As a result, each metal particle 34 or each spatial volume or voxel of the polymer precursor 30 in three-dimensional space has its own individual electromagnetic niche (=spatial encoding) inherent to it in the intersection of the at least three gradient fields.

Thus, if the magnetic microenvironment of each oscillator or each voxel of the 3D polymer structure 28/polymer precursor 30 differs linearly in at least all three spatial directions from the magnetic microenvironment of its neighboring oscillator or adjacent voxel (=neighboring voxel), then each nanoparticle or the nanoparticles of each individual voxel has/have its own individual resonant frequency, and can therefore be individually addressed in isolation, and selectively excited by an undirected electromagnetic RF field. In this case, the respective steepness of the x, y, z gradient fields defines the edge lengths of the voxels in all 3 spatial directions x, y, z, ideally by a simultaneous total superposition of their local field strength, alternatively, sequentially, e.g., using the inverse Fourier transformation.

The control unit 22 of the device 10 is set up to control the RF field generator 20 in such a way that RF radiation with a field frequency tuned to the resonant frequency of the metal particles/oscillators is irradiated into the working zone 26 in order to heat and destroy the 3D polymer structure 28 or the polymer precursor 30 in the previously spatially encoded voxel V or in the previously spatially encoded contiguous volume unit of the 3D polymer structure 28/polymer precursor 30 locally "en bloc" and/or in case of the polymer precursor 30 to polymerize it.

The typical field frequency of the RF radiation for oscillation excitation of the paramagnetic substance is between 100 or 108 KHz and 789 THz.

The control unit 22 of the device 10 preferably has an operating mode which serves to obtain image data (e.g., magnetic resonance tomography imaging data) from the working zone 26 and/or the 3D polymer structure 28 and/or the polymer precursor 30. The control unit 22, in particular the computer system 24, serves to control all operating processes of the device 10 on the basis of predetermined CAD/CAM data. Furthermore, the control unit 22 is preferably configured to evaluate the image data. The control unit 22 can thus in particular be configured to compare the CAD/CAM data with the previously obtained image data and, when a discrepancy greater than a predefined permissible maximum deviation is detected, to continue the further machining and/or manufacturing process on the basis of the image data. Here, the control unit can in particular be configured (programmed) to modify the CAD/CAM data for the remaining 3D polymer structure to be processed or produced. In this way, the 3D polymer structure can be processed/produced with particularly tight tolerances.

During in-vivo processing and/or manufacturing (fabrication) of the 3D polymer structure 28, information on the anatomical structures adjacent to or interacting with the 3D polymer structure can furthermore be taken into account in real time in the manufacturing process. Here, the use of artificial intelligence or a software application with AI capability can be advantageous. Systematic deviations detected during the machining and/or manufacturing process, possibly as a function of the polymer precursor used, the paramagnetic substance, the milieu variables, etc., can be taken into account and prospectively incorporated in the creation of the CAD/CAM data for the 3D polymer structure in question and/or the machining or manufacturing process.

According to FIG. 3, the working zone 26 of the device can be encompassed by means of a, preferably gas-tight housing 36. For example, the housing 36 can be made of plastic or glass or another material that does not shield against RF fields or magnetic fields. The housing can be formed, for example, by a plastic film.

A pump 38 (FIG. 1) can be assigned to the working zone of the device 10, by means of which the atmosphere in the housing 36 can be evacuated or substantially evacuated and/or by means of which the working zone within the housing 36 can be filled with a fluid, in particular a working atmosphere A, specified for the manufacturing process. In this way, for example, undesired oxidative processes of the 3D polymer structure 28/polymer precursor 30 by oxygen contained in the working atmosphere A can be counteracted.

The device 10 can be formed in particular by a modified MRI unit whose control unit 22 is adapted to the processing and/or production of the 3D polymer structure in the manner explained above.

The polymer precursor 30 can have identical or different monomers and/or polymers (especially also dimers, oligomers). Furthermore, the 3D polymer structure 28/polymer precursor 30 may comprise fibers and/or one or more other additives as explained at the outset. By way of example only, additives from the group of dyes, antibacterial substances, antibiotics or growth factors may be mentioned here.

Depending on the mechanical, electrical or biological requirements demanded from the 3D polymer structure, the polymer precursor 30 may have a viscosity of approximately $10^2$ mPa·s to $10^5$ mPa·s or greater. If the 3D polymer structure 28 is to be used, for example, as an implant in humans/animals, the polymer precursor 30 in the non-polymerized state is preferably non-toxic to the animal/human organism and preferably degradable by the body's own enzymes and/or eliminable from the human/animal body per viam naturalis.

The device 10 can be used universally. For example, medical implants, in particular bone replacements, scaffolds for tissue/organs or vascular prostheses, can thus be produced. This can be done in vitro or directly in vivo.

Below, the method 100 for processing or producing a 3D polymer structure with a paramagnetic substance 32 (see FIG. 2) dispersed as homogeneously as possible in the material of the 3D polymer structure is explained in more detail with additional reference to the block diagram shown in FIG. 4.

The method 100 necessarily presupposes the use of the device 10 described above in the context of FIGS. 1 to 3 and comprises the following steps:

a) defining 102 CAD/CAM data 40 for the 3D polymer structure 28;

b) providing 104 the 3D polymer structure 28 in the working zone 26 of the device 10;

c) spatially encoding 106 a voxel V within the 3D polymer structure 28 as a function of the CAD/CAM data 40 by applying magnetic gradient fields $B_1$, $B_2$, $B_3$;

d) destroying 108 the 3D polymer structure 28 in the at least one spatially encoded voxel V by irradiating 110 RF radiation 42 by means of which the paramagnetic substance 32 in the respective voxel V is excited to destructive thermogenic oscillations; and e) repeating steps 106 and 108 for further voxels V within the 3D polymer structure 28, i.e., sequentially spatially encoding further, preferably spatially adjacent, voxels V in the 3D polymer structure 28 as a function of the CAD/CAM data and destruction of the 3D polymer structure 28 in the respective further spatially encoded voxels V by irradiating (110) RF radiation 42, by means of which the paramagnetic substance (32) in the respective further voxel V is excited to destructive thermogenic oscillations until the 3D polymer structure (28) has been processed.

The following process steps serve the generation of the 3D structure 28 within the working zone 26 of the device 10 from a polymer precursor after step 102 of defining the CAD/CAM data of the polymer structure: arranging 114 of a polymer precursor 30 with a paramagnetic substance 32 distributed homogeneously or substantially homogeneously therein in the working zone 26 of the device 10; spatially encoding 116 a voxel V within the polymer precursor 30 as a function of the CAD/CAM data by applying magnetic gradient fields $B_1$, $B_2$, $B_3$; polymerizing 118 the polymer precursor 30 in the at least one spatially encoded voxel V by irradiating 120 RF radiation 42, by means of which the paramagnetic substance 32 in the respective further voxel V is excited to thermogenic oscillations; and subsequently sequentially spatially encoding 122 further voxels V, preferably spatially adjacent to one another in the polymer precursor 30 as a function of the CAD/CAM data 40 and polymerizing 124 of the polymer precursor in the respective further spatially encoded voxels V by irradiating 126 RF radiation 42, by means of which the paramagnetic substance 32 in the respective further voxel V is excited to thermogenic oscillations until the 3D polymer structure to be produced is polymerized.

The frequency f of the RF radiation 42, i.e., of the applied RF field, is preferably tuned to the respective resonant frequency $f_0$ of the paramagnetic substance 32 to be excited with the RF radiation and/or to the metal particles 34 of the polymer precursor 30 or coincides with it. The resonant frequency $f_0$ of the respective paramagnetic substance 32 can be determined experimentally.

It should be noted that the voxels V of the 3D polymer structure and/or the polymer precursor can each have a uniform size or can differ at least partially in size from one another.

According to a further embodiment of the invention, image data 44 of the non-polymerized and/or the polymerized polymer precursor 30 may be obtained in an optional step or steps 128, in particular by magnetic resonance tomography or by an alternative imaging method. Steps 124 may occur after any other process step.

In an optional step 130, the image data 44 can be compared with the CAD/CAM data 40 and the CAD/CAM data 40 for the 3D polymer structure 28 can be modified on the basis of the image data for generating the remaining 3D polymer structure 28 if a maximum deviation of the already generated 3D polymer structure 28 is exceeded. In this way, the 3D polymer structure 28 can be processed or produced with a particularly tight tolerance.

For medical indications, the 3D polymer structure 28 can be completely processed or generated in a first living being (not shown in the drawing), i.e., in-vivo, in order to be available as an implant for another living being (not shown) after its removal.

By means of the method 100 according to the invention, as described at the outset, any 3D polymer structures, for example articles of daily use, machine parts, support structures for cells, tissue, organs can be processed and optionally also produced.

What is claimed is:

1. A device configured for processing a 3D polymer structure with a paramagnetic substance distributed as homogeneously as possible in a material or a polymer precursor of the 3D polymer structure, comprising:

a magnetic field generator configured for generating a static magnetic field $B_0$ in a working zone of the device, in which the 3D polymer structure can be arranged;

gradient coils configured for generating magnetic gradient fields $B_1$, $B_2$, $B_3$ in at least all three spatial directions x, y, z, by means of which the paramagnetic substance can be spatially encoded in a defined voxel V of the 3D polymer structure;

a radio frequency field generator for irradiating RF radiation into the working zone; and a control unit which is configured to control the RF field generator in such a way that the spatially encoded paramagnetic substance in the voxel V can be excited by means of a field frequency f of the RF radiation tuned to the paramagnetic substance in order to destroy the 3D polymer structure solely in the defined voxel V;

wherein the device comprises an MRI unit or a different imaging appliance for obtaining image data; and wherein the control unit is configured to compare the image data of the 3D polymer structure with CAD/CAM data for the 3D polymer structure and, if deviations of the partially processed/partially generated 3D polymer structure from the CAD/CAM data are detected, being geometric deviations, to take into account the image data and/or the deviations during the further processing/generation of the 3D polymer structure.

2. The device according to claim 1, wherein the polymer precursor can be arranged in the working zone of the device, wherein the magnetic gradient fields $B_1$, $B_2$, $B_3$ can be generated in the at least all three spatial directions x, y, z by means of the gradient coils in order to spatially encode the paramagnetic substance sequentially in time in defined voxels V of the polymer precursor, and the control unit is configured to control the RF field generator in such a way that the paramagnetic substance in the respective spatially encoded voxels V can be excited by means of a field frequency f of the RF radiation tuned to the paramagnetic substance in such a way that thermal polymerization of the polymer precursor is ensured in the defined voxels V.

3. The device according to claim 1, wherein the field frequency f of the RF radiation is between between 1 KHz and 789 THz.

4. The device according to claim 1, wherein the field frequency f of the RF radiation is between 100 KHz or 108 KHz and 789 THz.

5. The device according to claim 1, wherein the field frequency f of the RF radiation is between 108 KHz and 789 THz.

6. The device according to claim 1, wherein the working zone is arranged within a housing.

7. The device according to claim 6, wherein the paramagnetic substance comprises metal particles in the form of nanoparticulate magnetite particles, nanoparticulate iron particles, or metal organyls.

8. The device according to claim 7, wherein the metal particles are present in a concentration of >1000 particles per cubic millimetre of the 3D polymer structure and/or the polymer precursor.

9. The device according to claim 7, wherein the metal particles are present in a concentration of >10,000 particles per cubic millimetre of the 3D polymer structure and/or the polymer precursor.

10. The device according to claim 1, wherein the material of the 3D polymer structure or of the polymer precursor comprises one or more additives, being selected from the group of fibers, dyes, antibacterial substances, growth factors, nanoparticles/tubes, mineral fillers, metallic materials, glycosaminoglycans, MMC substances, polypeptide motifs, promoters, terminators, inhibitors, catalysts, sensitizers and/or immunomodulators.

11. A method for processing the 3D polymer structure with the paramagnetic substance distributed as homogeneously as possible in the material or the polymer precursor of the 3D polymer structure by means of the device according to claim 1, comprising the following steps:

a. defining the CAD/CAM data for the 3D polymer structure;

b. arranging the 3D polymer structure in the working zone of the device;

c. spatially encoding a voxel V within the 3D polymer structure as a function of the CAD/CAM data by applying the magnetic gradient fields $B_1$, $B_2$, $B_3$;

d. destroying the 3D polymer structure solely in the spatially encoded voxel V by irradiating the RF radiation by means of which the paramagnetic substance in the respective voxel V is excited to destructive thermogenic oscillations; and e. repeating the steps c) and d) for further voxels V within the 3D polymer structure.

12. The method according to claim 11, including the further steps of:

f. arranging the polymer precursor with the paramagnetic substance homogeneously or substantially homogeneously distributed therein;

g. spatially encoding at least one voxel V within the 3D polymer precursor as the function of the CAD/CAM data by applying the magnetic gradient fields $B_1$, $B_2$, $B_3$; and h. polymerizing the polymer precursor in the at least one spatially encoded voxel V by irradiating the RF radiation by means of which the paramagnetic substance in the respective voxel V is excited to thermogenic oscillations; and i. repeating the steps g) and h) to generate the 3D polymer structure.

13. The method according to claim 11, wherein the field frequency f of the RF radiation is selected depending on the resonant frequency $f_0$ of the paramagnetic substance to be excited with the RF radiation.

14. The method according to claim 11, wherein the voxels V are each defined with a uniform volume size or in that the voxels V are at least partially defined with a different volume size.

15. The method according to claim 11, wherein the image data are obtained for the 3D polymer structure, being by magnetic resonance tomography as the MRI unit, and the further processing/generation of the 3D polymer structure takes place taking into account these magnetic resonance tomography data.

* * * * *